United States Patent
Campbell et al.

(10) Patent No.: US 9,085,949 B2
(45) Date of Patent: Jul. 21, 2015

(54) FLUID SEAL WITH SWELLABLE MATERIAL PACKING

(75) Inventors: Robert Angus Campbell, Tomball, TX (US); Richard T. Schmidt, Spring, TX (US)

(73) Assignee: Freudenberg Oil & Gas, LLC, Plymouth, MI (US)

( * ) Notice: Subject to any disclaimer, the term of this patent is extended or adjusted under 35 U.S.C. 154(b) by 437 days.

(21) Appl. No.: 13/603,085

(22) Filed: Sep. 4, 2012

(65) Prior Publication Data

US 2014/0060805 A1    Mar. 6, 2014

(51) Int. Cl.
*E21B 33/03* (2006.01)
*E21B 33/04* (2006.01)
*F16J 15/46* (2006.01)

(52) U.S. Cl.
CPC ............. *E21B 33/03* (2013.01); *E21B 33/04* (2013.01); *F16J 15/46* (2013.01)

(58) Field of Classification Search
CPC ............ E21B 33/03; F15J 15/46; F16L 17/10
See application file for complete search history.

(56) References Cited

U.S. PATENT DOCUMENTS

| | | | | |
|---|---|---|---|---|
| 2,945,541 A | | 7/1960 | Maly et al. | |
| 3,294,243 A | * | 12/1966 | Cerles | 210/402 |
| 4,381,114 A | * | 4/1983 | Vanderford, Jr. | 277/322 |
| 4,556,224 A | * | 12/1985 | Le | 277/328 |
| 4,593,914 A | * | 6/1986 | Johnson | 277/322 |
| 4,669,736 A | * | 6/1987 | Meijer | 277/478 |
| 5,071,139 A | * | 12/1991 | Warner | 277/500 |
| 5,180,008 A | * | 1/1993 | Aldridge et al. | 277/322 |
| 5,826,887 A | * | 10/1998 | Neumann et al. | 277/605 |
| 2010/0139930 A1 | | 6/2010 | Patel et al. | |

* cited by examiner

*Primary Examiner* — Giovanna C Wright
(74) *Attorney, Agent, or Firm* — Harness, Dickey & Pierce, P.L.C.

(57) ABSTRACT

The present disclosure provides a casing seal for a wellhead, including a casing with an internal surface having an annular groove therein. A fluid seal is disposed in the annular groove and includes an internal bead for sealing against a cylindrical surface of an inner case or tube. A swellable material is disposed within the annular groove and surrounds the fluid seal. An energizing port is in communication with the annular groove for delivering fluid to the swellable material to cause the swellable material to expand and further load the fluid seal.

24 Claims, 3 Drawing Sheets

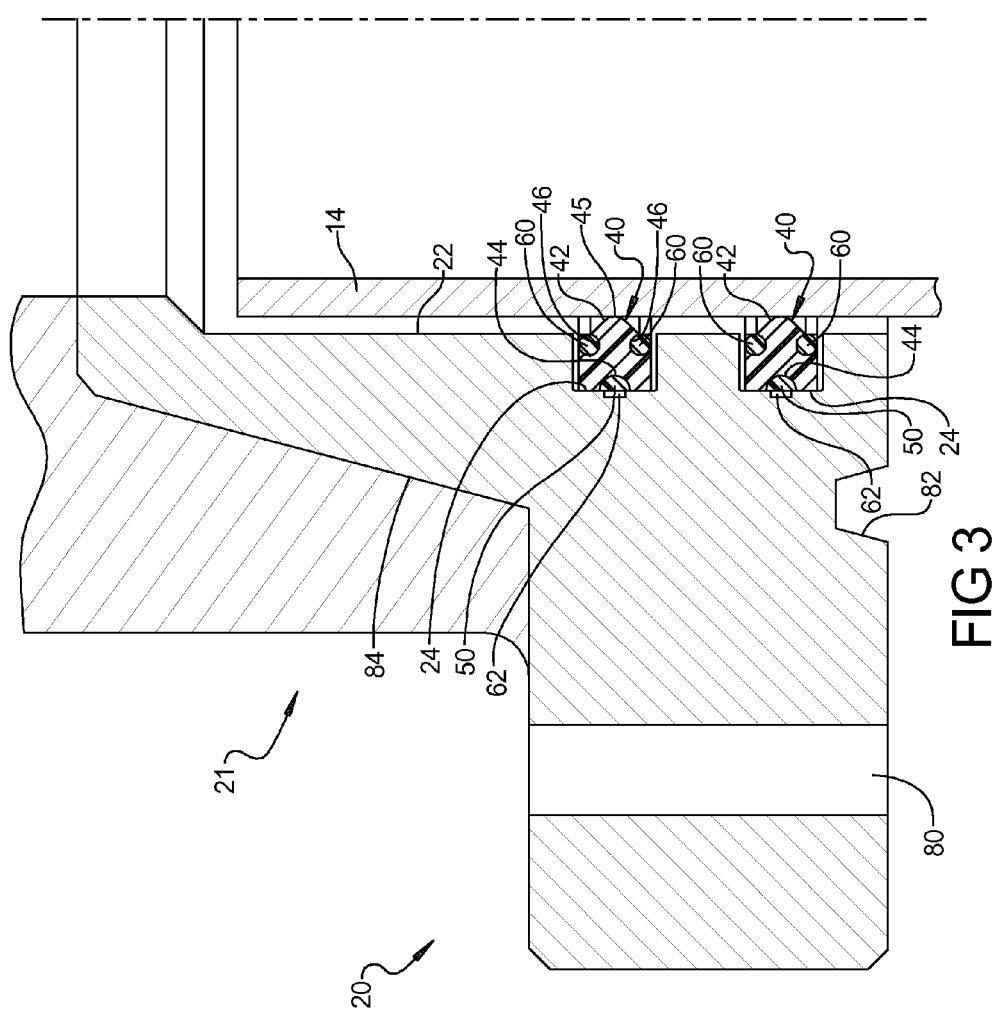

FLUID SEAL WITH SWELLABLE MATERIAL PACKING

FIELD

The present disclosure relates to annular wellhead seals and more particularly, to a wellhead seal having a fluid seal with swellable material packing.

BACKGROUND

This section provides background information related to the present disclosure which is not necessarily prior art.

Once a natural gas or oil well is drilled, the well must be completed to allow for the flow of petroleum or natural gas out of the formation and up to the surface. This process includes strengthening the well hole with a casing structure and then installing equipment to ensure efficient flow of natural gas or oil out of the well. The well casing consists of a series of metal tubes installed in the freshly drilled hole. The casings strengthen the sides of the well hole, ensures that no oil or natural gas seeps out of the well hole as it is brought to the surface, and keeps other fluids or gases from seeping into the formation through the well. Often times, there are multiple different layers of casings, including a conductor casing which is typically installed first prior to drilling with the drilling rig. The conductor casing is installed to prevent the top of the well from caving in and to help in the process of circulating the drilling fluid up from the bottom of the well. This casing is sometimes between 16-20 inches in diameter and is cemented into place before filling begins. A surface casing is the next type of casing to be installed. It can be anywhere from a few hundred to two-thousand feet long and is smaller in diameter than the conductor casing. When installed, the surface casing fits inside the top of the conductor casing. The primary purpose of the surface casing is to protect fresh water deposits near the surface of the well from being contaminated by leaking hydrocarbons or salt water from deeper underground. It also serves as a conduit for drilling mud returning to the surface and helps protect the drill hole from being damaged during drilling. The surface casing, like the conductor casing, is cemented into place.

An intermediate casing is usually the longest section of casing found in a well. The primary purpose of the intermediate casing is to minimize the hazards that come along with subsurface formations that may affect the well. These include abnormal underground pressure zones, underground shale, and formations that might otherwise contaminate the well, such as underground salt water deposits. In many instances, even though there may be no evidence of an unusual underground formation, the intermediate casing is run as insurance against the possibility of such a formation affecting the well. Liner strings are sometimes used instead of the intermediate casing. Liner strings are commonly run from the bottom of another type of casing to the open well area.

A production casing, alternatively called the oil string or long string, is installed last and is the deepest section of casing in a well. This is the casing that provides a conduit from the surface of the well to the petroleum-producing formation. The size of the production casing depends on a number of considerations, including the lifting equipment to be used, the number of completions required, and the possibility of deepening the well at a later time.

The wellhead consists of the pieces of equipment mounted at the opening of the well to manage the extraction of hydrocarbons from the underground formation. It prevents leaking of oil and natural gas out of the well, and also prevents blowouts caused by high pressure. Formations that are under high pressure typically require wellheads that can withstand a great deal of upward pressure of the escaping gases and liquids. These wellheads must be able to withstand pressures of up to 20,000 pounds per square inch. The wellhead typically consists of three components, the casing head, the tubing head, and the christmas tree.

The casing head consists of heavy fittings that provide a seal between the fitting and the surface of the casings. The casing head also serves to support the entire length of casing that is run all the way down the well. This piece of equipment typically contains a gripping mechanism that ensures a tight seal between the head and the casing itself. The tubing head is much like the casing head; it provides a seal between the tubing, which is run inside the casing, and the surface. Like the casing head, the tubing head is designed to support the entire length of the casing, as well as provide connections at the surface which allow the flow of fluids out of the well to be controlled. The christmas tree is the piece of equipment that fits on top of the casing and tubing heads, and contains tubes and valves that control the flow of hydrocarbons and other fluids out of the well. It commonly contains many branches and is shaped somewhat like a tree, thus its name "christmas tree." The christmas tree is the most visible part of a producing well, and allows for the surface monitoring and regulation of the production of hydrocarbons from a producing well. As previously noted, the components of the casing head provide a tight seal between the casing and the surface of the inner casings.

SUMMARY

This section provides a general summary of the disclosure, and is not a comprehensive disclosure of its full scope or all of its features.

The present disclosure provides a casing seal for a wellhead, including a casing with an internal surface having an annular groove therein. A fluid seal is disposed in the annular groove and includes an internal bead for sealing against a cylindrical surface of an inner case or tube. A swellable material is disposed within the annular groove and surrounds the fluid seal. An energizing port is in communication with the annular groove for delivering fluid to the swellable material to cause the swellable material to expand and further load the fluid seal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a cross-sectional view taken along a different cross section of the casing seal according to the principles of the present disclosure.

DETAILED DESCRIPTION

Figure 1:
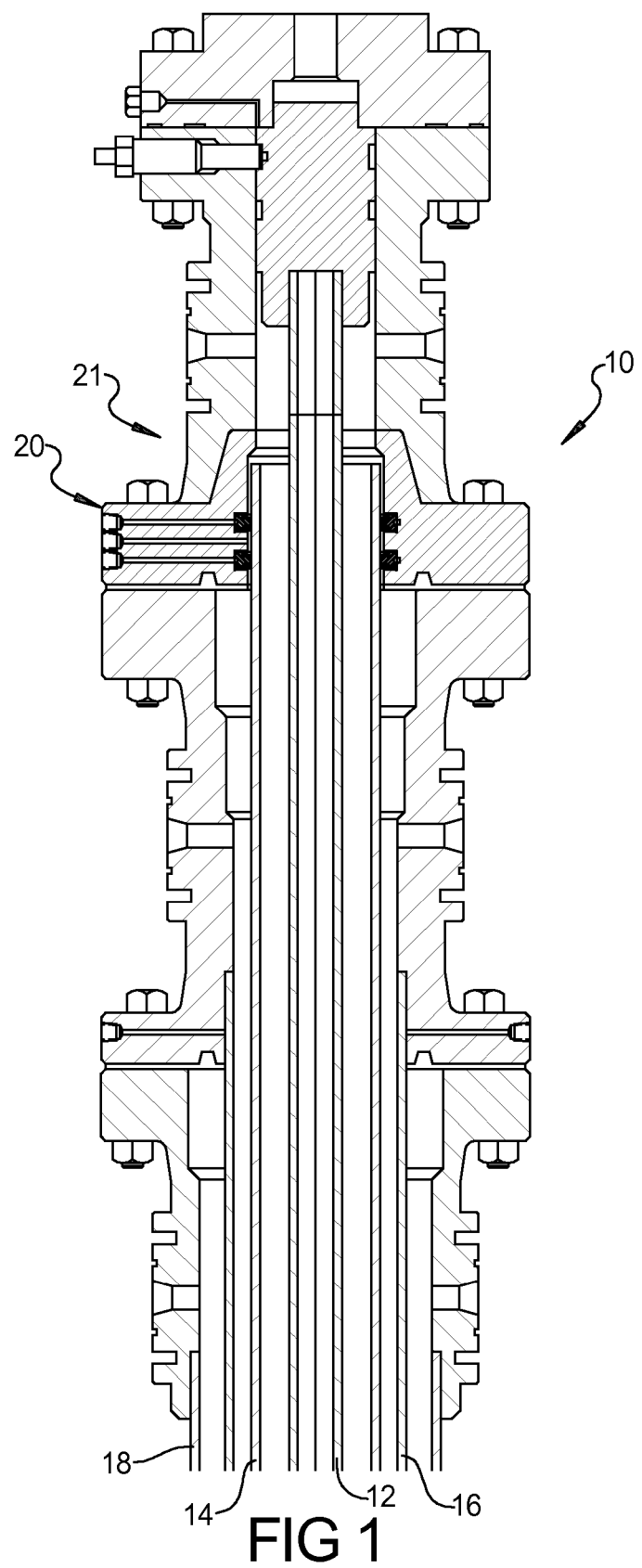
FIG. 1 is a partial cross-sectional view of a wellhead incorporating a fluid seal with swellable material packing, according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a partial cross-sectional view of a wellhead 10 according to the principles of the present disclosure will now be described. The wellhead 10 receives a production tubing 12 that is surrounded by an intermediate casing 14, a surface casing 16, and a conductor casing 18 as discussed previously in the background section of the present application. Without intending to be limited by example, the production tubing 12 can be 4.5 inches in diameter, while the intermediate casing 14 can be 9⅝ inches in diameter, the surface casing 16 can be 13⅜ inches in diameter, and the conductor casing 18 can be 20 inches in diameter. The wellhead 10 can include casing segments 20 that surround and sealingly engage the casings 14, 16, and 18. The casing segment 20 can be part of a welded assembly 21, as shown in FIG. 1, or can have other configurations.

Figure 2:
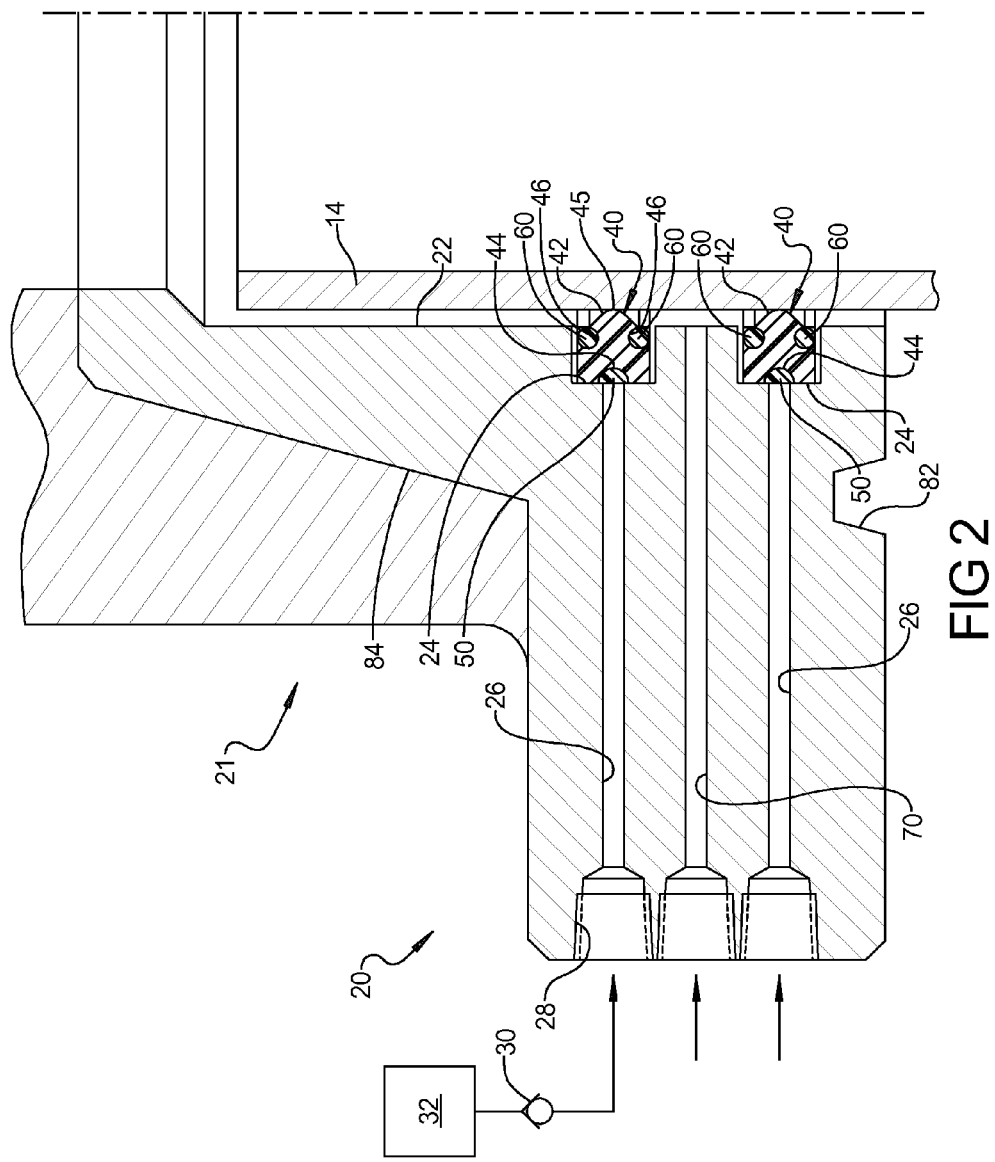
FIG. 2 is a cross-sectional view of a casing seal according to the principles of the present disclosure.

With reference to FIGS. 2 and 3, the annular casing 20 has an inner surface 22 and can include one or more recessed grooves 24 therein. An energizing port 26 is provided for each groove 24 and extends from an outer surface of the casing 20 to the recessed groove 24. Each energizing port 26 can be provided with a threaded bore 28 for receiving a threaded connection. The threaded connection can be connected to a check valve 30 and pump 32 that allow the introduction of a fluid to the energizing port 26.

A fluid seal 40 is disposed in the annular recessed grooves 24. The fluid seals have an inner surface 42 for sealingly engaging a cylindrical surface of a casing member (14, 16, 18) and an outer surface 44. The fluid seals 40 are surrounded by a swellable material 50 that is disposed in the recessed groove and extends around the outer surface 44 of the fluid seal 40. The swellable material 50 can be an oil swellable material or other type of known swellable material which, when exposed to a fluid such as oil, causes the material 50 to swell and apply external pressure on the fluid seal 40 to increase the sealing pressure against the outer cylindrical surface of a casing received therein. The fluid seal 40 can include a raised bead portion 45 for engaging the inner casing, as well as recesses 46 on opposite sides of the raised bead 45. The recesses 46 receive steel springs 60 therein that strengthen the fluid seal 40 and prevent extrusion thereof.

As illustrated in FIG. 3, the annular recessed groove 24 can include a secondary groove channel 62 extending radially therefrom for providing a channel for delivery of the fluid from the energizing port 26 around the entire periphery of the groove 24 in order to adequately wet and thereby swell the swellable material 50 around the entire perimeter thereof. It is noted that the outer surface 44 of the fluid seal 40 can include a recessed groove therein for receiving the swellable material 50. The energizing port 26 can be utilized to re-energize the swellable material 50 by introducing oil at various intervals in order to re-energize the seal 40. The use of the pump 32 and check valve 30 allows the oil or other fluid introduced through the energizing port to be controlled and maintained within the energizing port. A test port 70 can be provided for communicating with the space between the fluid seals 40 in order to test the seals 40 for adequate sealing pressure.

The annular casing 20 can include a radially extending flange 20a having a plurality of bolt holes 80 therethrough to allow the annular casing 20 to be mounted to adjacent casing members 20. The casing member 20 can include an annular recessed groove 82 in a face thereof that can receive an axial end portion 84 of an adjacent (typically larger) casing member 20.

It is noted that the fluid seals can be made of an elastomer or other known sealing material, while the casing 20 can be made of steel or other known materials. The swellable material can include several different types of commercially available elastomers that will swell sufficiently in the created fluid environment. Examples include acrylonitrile butadiene rubber (NBR), hydrogenated nitrile butadiene rubber (HNBR), and fluoroelastomer (FKM).

With the seal design of the present disclosure, the proposed design utilizes a swellable medium to preload and permanently energize the seal in both primary and secondary applications. The use of the swellable material provides a simplification of the wellhead, as well as improved reliability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal, comprising:
    an annular casing having an inner surface with at least one annular recessed groove therein and a port extending from an outer surface of said casing to said recessed groove;
    a fluid seal disposed in said annular recessed groove, said fluid seal having an inner surface for sealingly engaging a cylindrical surface and an outer surface; and
    an oil swellable elastomer material disposed in said recessed groove and extending around said outer surface of said fluid seal, wherein oil is introduced to said oil swellable material through said port to cause said oil swellable material to swell and apply external pressure on said fluid seal to increase a sealing pressure against said cylindrical surface.

2. The seal according to claim 1, wherein said at least one annular recessed groove includes a pair of annular recessed grooves spaced from one another and each including a port extending from an outer surface of said casing to said pair of annular recessed grooves, each said annular recessed groove having a fluid seal disposed therein and an oil swellable elastomer material disposed in each said recessed groove and extending around said fluid seal.

3. The seal according to claim 2, further comprising a test port extending through said casing and communicating with said inner surface of said casing between said pair of annular grooves.

4. The seal according to claim 1, further comprising a secondary groove channel extending radially outward from said annular recessed groove and communicating with said port, said secondary groove channel delivering oil from said port to said oil swellable material.

5. The seal according to claim 1, wherein said fluid seal has an outer surface with a recessed groove that receives said oil swellable elastomer material therein.

6. The seal according to claim 5, wherein said oil swellable elastomer material is made from an elastomer selected from the group of acrylonitrile butadiene rubber, hydrogenated nitrile butadiene rubber, and fluoroelastomer.

7. The seal according to claim 1, wherein said fluid seal includes a raised bead on an inner surface thereof and a pair of recessed grooves on opposite sides of said raised bead with a pair of steel springs disposed in said pair of recessed grooves.

8. The seal according to claim 1, wherein said port includes a check valve and pump for reenergizing the oil swellable elastomer material by the reintroduction of oil.

9. A wellhead, comprising:
    an annular outer casing having an inner surface with at least one annular recessed groove therein and a port extending from an outer surface of said outer casing to said recessed groove;
    an inner casing disposed in said annular outer casing;
    a fluid seal disposed in said annular recessed groove in said outer casing, said fluid seal having an inner surface for sealingly engaging a cylindrical surface of said inner casing and an outer surface; and
    an oil swellable elastomer material disposed in said recessed groove and extending around said outer surface of said fluid seal, wherein oil is introduced to said oil swellable material through said port to cause said oil swellable material to swell and apply external pressure on said fluid seal to increase a sealing pressure against said cylindrical surface.

10. The wellhead according to claim 9, wherein said at least one annular recessed groove includes a pair of annular recessed grooves spaced from one another and each including a port extending from an outer surface of said outer casing to said pair of annular recessed grooves, each said annular recessed groove having a fluid seal disposed therein and an oil swellable elastomer material disposed in each said recessed groove and extending around said fluid seal.

11. The wellhead according to claim 10, further comprising a test port extending through said outer casing and communicating with said inner surface of said casing between said pair of annular grooves.

12. The wellhead according to claim 9, further comprising a secondary groove channel extending radially outward from said annular recessed groove and communicating with said port, said secondary groove channel delivering oil from said port to said oil swellable elastomer material.

13. The wellhead according to claim 9, wherein said fluid seal has an outer surface with a recessed groove that receives said oil swellable elastomer material therein.

14. The wellhead according to claim 13, wherein said oil swellable elastomer material is made from an elastomer selected from the group of acrylonitrile butadiene rubber, hydrogenated nitrile butadiene rubber, and fluoroelastomer.

15. The wellhead according to claim 9, wherein said fluid seal includes a raised bead on an inner surface thereof and a pair of recessed grooves on opposite sides of said raised bead with a pair of steel springs disposed in said pair of recessed grooves.

16. The wellhead according to claim 9, further comprising a check valve and pump connected to said port for reenergizing the oil swellable elastomer material by the reintroduction of oil.

17. A seal, comprising:
    an annular casing having an inner surface with at least one annular recessed groove therein and a port extending from an outer surface of said casing to said recessed groove;

a fluid seal disposed in said annular recessed groove, said fluid seal having an inner surface for sealingly engaging a cylindrical surface and an outer surface; and a swellable elastomer material disposed in said recessed groove and extending around said outer surface of said fluid seal, wherein a fluid is introduced to said swellable elastomer material through said port to cause said swellable elastomer material to swell and apply external pressure on said fluid seal to increase a sealing pressure against said cylindrical surface.

18. The seal according to claim 17, wherein said at least one annular recessed groove includes a pair of annular recessed grooves spaced from one another and each including a port extending from an outer surface of said casing to said pair of annular recessed grooves, each said annular recessed groove having a fluid seal disposed therein and a swellable material elastomer disposed in each said recessed groove and extending around said fluid seal.

19. The seal according to claim 18, further comprising a test port extending through said casing and communicating with said inner surface of said casing between said pair of annular grooves.

20. The seal according to claim 17, further comprising a secondary groove channel extending radially outward from said annular recessed groove and communicating with said port, said secondary groove channel delivering oil from said port to said swellable elastomer material.

21. The seal according to claim 17, wherein said fluid seal has an outer surface with a recessed groove that receives said swellable elastomer material therein.

22. The seal according to claim 21, wherein said swellable elastomer material is made from an elastomer selected from the group of acrylonitrile butadiene rubber, hydrogenated nitrile butadiene rubber, and fluoroelastomer.

23. The seal according to claim 17, wherein said fluid seal includes a raised bead on an inner surface thereof and a pair of recessed grooves on opposite sides of said raised bead with a pair of steel springs disposed in said pair of recessed grooves.

24. The seal according to claim 17, wherein said port includes a check valve and pump for reenergizing the swellable elastomer material by the reintroduction of fluid.

* * * * *